(12) United States Patent
Gupta et al.

(10) Patent No.: US 12,028,361 B2
(45) Date of Patent: Jul. 2, 2024

(54) INTELLIGENT DETECTION AND PREVENTION OF ANOMALIES IN INTERFACE PROTOCOLS

(71) Applicant: Dell Products L.P., Round Rock, TX (US)

(72) Inventors: Chitrak Gupta, Bangalore (IN); Ajay Shenoy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 263 days.

(21) Appl. No.: 16/925,951

(22) Filed: Jul. 10, 2020

(65) Prior Publication Data

US 2021/0306359 A1 Sep. 30, 2021

(30) Foreign Application Priority Data

Mar. 28, 2020 (IN) .............................. 202011013692

(51) Int. Cl.
*G06F 15/16* (2006.01)
*H04L 9/40* (2022.01)
(Continued)

(52) U.S. Cl.
CPC ...... *H04L 63/1425* (2013.01); *H04L 41/0627* (2013.01); *H04L 43/0882* (2013.01); *H04L 43/16* (2013.01); *H04L 45/42* (2013.01); *H04L 45/52* (2013.01); *H04L 47/12* (2013.01); *H04L 63/0236* (2013.01); *H04L 63/1441* (2013.01); *H04L 63/20* (2013.01)

(58) Field of Classification Search
CPC . H04L 63/0236; H04L 63/1441; H04L 63/20; H04L 43/18
See application file for complete search history.

(56) References Cited

U.S. PATENT DOCUMENTS 8,339,959 B1 * 12/2012 Moisand ............... H04L 45/302
370/235
8,484,325 B1 * 7/2013 Maity ..................... H04L 43/50
709/224

(Continued)

OTHER PUBLICATIONS

Cisco Intrusion Prevention System Modules for the Cisco Integrated Services Routers, www.cisco.com, dated Apr. 15, 2008, downloaded Jan. 8, 2020, 4 pages.

*Primary Examiner* — Hieu T Hoang
(74) *Attorney, Agent, or Firm* — Jackson Walker L.L.P.

(57) ABSTRACT

An information handling system may include a management controller configured to provide out-of-band management of the information handling system. The management controller may be configured to: receive network traffic from a client information handling system, the network traffic relating to management of the information handling system; and transmit at least a portion of the network traffic to a traffic classifier. The traffic classifier may be configured to: determine a protocol associated with the network traffic; compare the network traffic with protocol-specific classification data based on the determined protocol; and determine, based on the comparison, a likelihood that the network traffic is malicious. Based on the determined likelihood exceeding a threshold, the management controller may be configured to execute a remedial action with respect to the network traffic.

20 Claims, 3 Drawing Sheets

(51) Int. Cl.
*H04L 41/0604* (2022.01)
*H04L 43/0882* (2022.01)
*H04L 43/16* (2022.01)
*H04L 45/42* (2022.01)
*H04L 45/52* (2022.01)
*H04L 47/12* (2022.01)

(56) References Cited

U.S. PATENT DOCUMENTS

| | | | |
|---|---|---|---|
| 9,413,783 B1* | 8/2016 | Keogh | H04L 63/1458 |
| 9,455,977 B1* | 9/2016 | Bailey | H04L 9/32 |
| 9,594,904 B1* | 3/2017 | Jain | G06N 7/005 |
| 10,038,705 B2 | 7/2018 | Jreij et al. | |
| 10,599,504 B1* | 3/2020 | BeSerra | G06F 11/3055 |
| 10,764,313 B1* | 9/2020 | Mushtaq | G06N 20/00 |
| 11,113,070 B1* | 9/2021 | Kulchytskyy | G06F 9/44505 |
| 2003/0084326 A1* | 5/2003 | Tarquini | H04L 63/1408 726/23 |
| 2005/0102414 A1* | 5/2005 | Hares | H04L 47/2475 709/232 |
| 2005/0229173 A1* | 10/2005 | Mihm | G06F 8/65 717/171 |
| 2007/0150574 A1* | 6/2007 | Mallal | H04L 63/1408 709/223 |
| 2007/0180107 A1* | 8/2007 | Newton | H04L 63/1425 709/224 |
| 2008/0291916 A1* | 11/2008 | Xiong | H04L 45/127 370/392 |
| 2009/0077632 A1* | 3/2009 | Carpenter | H04L 63/1441 726/3 |
| 2009/0103524 A1* | 4/2009 | Mantripragada | H04L 65/1079 370/352 |
| 2012/0124665 A1* | 5/2012 | Dubey | H04W 12/122 726/22 |
| 2012/0158890 A1* | 6/2012 | Jreij | G06F 11/3058 713/1 |
| 2013/0298244 A1* | 11/2013 | Kumar | G06F 21/51 726/25 |
| 2014/0052309 A1* | 2/2014 | Chandrasekhar | G06F 1/266 700/297 |
| 2014/0181844 A1* | 6/2014 | Von Bokern | G06F 9/4411 719/321 |
| 2014/0208133 A1* | 7/2014 | Gopal | G06F 11/2294 713/310 |
| 2015/0304233 A1* | 10/2015 | Krishnamurthy | G06F 9/4401 709/226 |
| 2016/0308886 A1* | 10/2016 | Lee | H04L 63/1425 |
| 2017/0104770 A1* | 4/2017 | Jreij | H04L 63/1416 |
| 2017/0126740 A1* | 5/2017 | Bejarano Ardila | H04L 63/1433 |
| 2017/0180216 A1* | 6/2017 | Peng | H04L 67/10 |
| 2017/0180421 A1* | 6/2017 | Shieh | H04L 63/10 |
| 2018/0004948 A1* | 1/2018 | Martin | H04L 63/1425 |
| 2018/0041344 A1* | 2/2018 | Rahardjo | G06F 21/57 |
| 2018/0131717 A1* | 5/2018 | Kim | H04L 63/1458 |
| 2018/0198812 A1* | 7/2018 | Christodorescu | H04L 63/1425 |
| 2018/0293197 A1* | 10/2018 | Grobelny | G06F 13/4081 |
| 2019/0294995 A1* | 9/2019 | Pastor Perales | H04L 43/028 |
| 2020/0092256 A1* | 3/2020 | Hansen | H04L 41/28 |
| 2020/0314115 A1* | 10/2020 | Nabeesa | H04L 63/1408 |
| 2021/0051175 A1* | 2/2021 | Lyle | H04L 63/1416 |
| 2021/0141626 A1* | 5/2021 | Ladkani | G06F 3/0676 |
| 2021/0218594 A1* | 7/2021 | Sundararajan | H04L 41/145 |

* cited by examiner

INTELLIGENT DETECTION AND PREVENTION OF ANOMALIES IN INTERFACE PROTOCOLS

TECHNICAL FIELD

The present disclosure relates in general to information handling systems, and more particularly to the detection and prevention of anomalies in interface protocols.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, global communications. In or addition, information handling systems may include a variety of hardware and software components that may be configured to process, store, and communicate information and may include one or more computer systems, data storage systems, and networking systems.

Management controllers may provide a variety of different interfaces and protocols (typically HTTP/HTTPS-based) for out-of-band or in-band management of server information handling systems. Security issues are a common problem, and many of the commonly hacked ports are the ones which management controllers keep open, making them extremely vulnerable to attacks. As some examples of common interfaces, many management controllers enable graphical user interfaces (GUIs), command line user interfaces, Intelligent Platform Management Interface (IPMI), Secure Shell (SSH), Remote Access Controller Administration (RACADM), Web Services-Management (WS-MAN), Redfish, etc.

Some of the commonly used open ports that attackers may exploit include TCP: 80 (HTTP), TCP: 443 (HTTPS), TCP: 25 (SMTP), TCP/UDP:53 (DNS), etc.

Management controllers may have process-level security practices and provide access controls through strict security policies (e.g., SELinux policies) but it is difficult to prevent in-process accesses. For example, it has historically been difficult to prevent attacks such as using allowed tools like WS-MAN to upload malicious files in the guise of a certificate or an executable update package. Further, multiple hacking tools make it easy to modify HTTP headers, manipulate sessions, and enable access of files.

One of the major defensive mechanisms is the use of an intrusion detection system (IDS). Network intrusion detection and prevention systems that use network signatures to identify traffic for specific adversary malware can be used to mitigate activity at the network level. Signatures are often for unique indicators within protocols and may be based on the specific protocol used by a particular adversary or tool, and may be different across various malware families and versions. Adversaries may change tool signatures over time or construct protocols in such a way as to avoid detection by common defensive tools.

Thus an IDS can provide a useful, if limited, threat mitigation in some circumstances. However, enabling a complete IDS (for example, the open-source IDS Snort) can be overly taxing on a small embedded processor such as the type typically found in management controllers.

Accordingly, it would be advantageous to provide an intelligent, data-driven, protocol anomaly detection system that is not overly taxing on a low-power processor. Some embodiments of this disclosure may implement a predictive classifier model and update the model based on transactions observed over the network and administrator feedback.

A standard IDS typically works with a static set of policies and rules, whereas embodiments of this disclosure may employ artificial intelligence (AI) techniques such as machine learning. Generally speaking, machine learning encompasses a branch of data science that emphasizes methods for enabling information handling systems to construct analytic models that use algorithms that learn interactively from data. It is noted that, although disclosed subject matter may be illustrated and/or described in the context of a machine learning or deep learning system, method, architecture, or application, such a system, method, architecture, or application is not limited to those particular techniques and may encompass one or more other AI solutions.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with detection and prevention of anomalies in interface protocols may be reduced or eliminated.

In accordance with embodiments of the present disclosure, an information handling system may include a management controller configured to provide out-of-band management of the information handling system. The management controller may be configured to: receive network traffic from a client information handling system, the network traffic relating to management of the information handling system; and transmit at least a portion of the network traffic to a traffic classifier, traffic classifier may be configured to: determine a protocol associated with the network traffic; compare the network traffic with protocol-specific classification data based on the determined protocol; and determine, based on the comparison, a likelihood that the network traffic is malicious. Based on the determined likelihood exceeding a threshold, the management controller may be configured to execute a remedial action with respect to the network traffic.

In accordance with these and other embodiments of the present disclosure, a method may include, in an information handling system comprising a management controller configured to provide out-of-band management of the information handling system: the management controller receiving network traffic from a client information handling system, the network traffic relating to management of the information handling system; the management controller transmitting at least a portion of the network traffic to a traffic classifier, wherein the traffic classifier is configured to: determine a protocol associated with the network traffic; compare the network traffic with protocol-specific classification data based on the determined protocol; and determine, based on the comparison, a likelihood that the network traffic is malicious. Based on a the determined likelihood exceeding threshold, the management controller may execute a remedial action with respect to the network traffic.

In accordance with these and other embodiments of the present disclosure, an article of manufacture may include a non-transitory, computer-readable medium having computer-executable code thereon that is executable by at least one processor of at least one information handling system for: receiving, from each of a plurality of management controllers of other information handling systems, portions of network traffic forwarded from respective client information handling systems, the network traffic relating to management via the management controllers; determining a protocol associated with each portion of the network traffic; comparing each portion of the network traffic with protocol-specific classification data based on the respective determined protocols; determining, based on the comparison, a likelihood that each portion of the network traffic is malicious; and for each portion of the network traffic, based on the determined likelihood exceeding a threshold, causing each respective management controller to execute a remedial action with respect to the network traffic.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic storage device, or any other suitable device, a network device and in may vary size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "couple-able" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a sequential access a hard disk drive or floppy disk), storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

Figure 1:
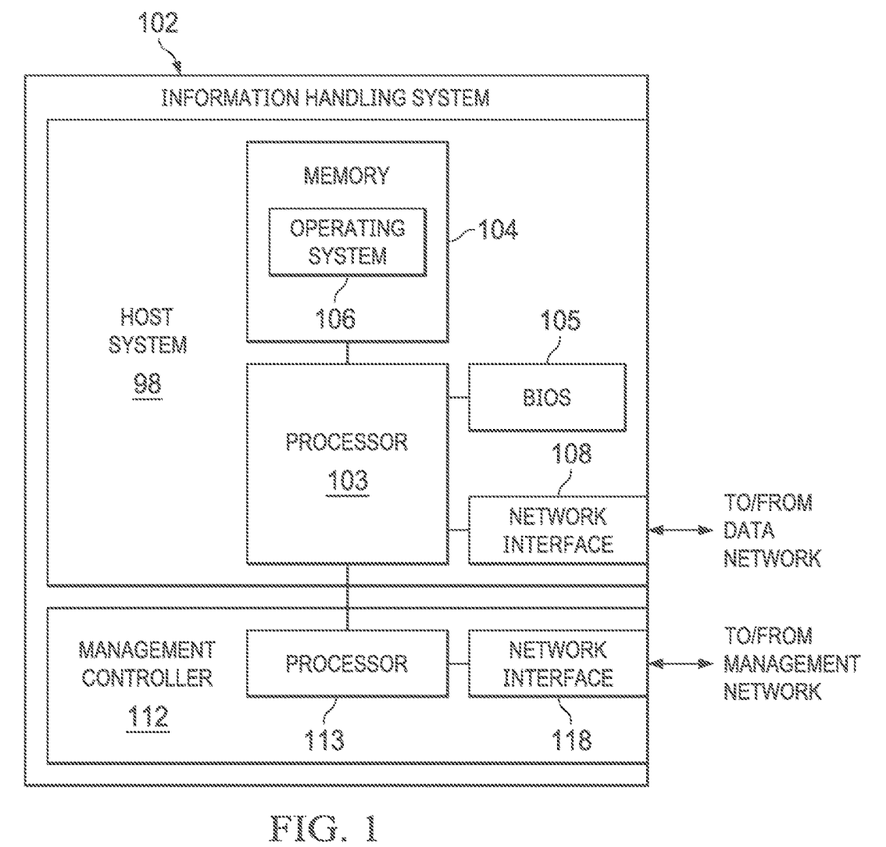
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for data storing (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may executable comprise any program of instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it would be advantageous to provide an intelligence-driven protocol analysis engine for the known protocols that are used by management controller 112 to take preventive action against probable intrusions. Such a solution can be extended to any implementation working with a known set of protocols.

System management traffic (e.g., traffic received by management controller 112 from the management network) is typically somewhat predictable. Patterns in such traffic may be used to classify and identify potentially malicious access attempts. Hacking attempts within a datacenter using out-of-band channels may be identified by setting up one instance of a classifier engine and configuring the various management controllers in the datacenter to automatically forward traffic to the classifier. The patterns can be updated periodically via downloads from a manufacturer or other security service.

Accordingly, some embodiments may enable the creation of a trained model based on known parameters of incoming traffic to management controllers such as management controller 112. Any probable intrusion events may be determined, for example, based on protocol parameters that do not match expectations of the trained model.

Figure 2:
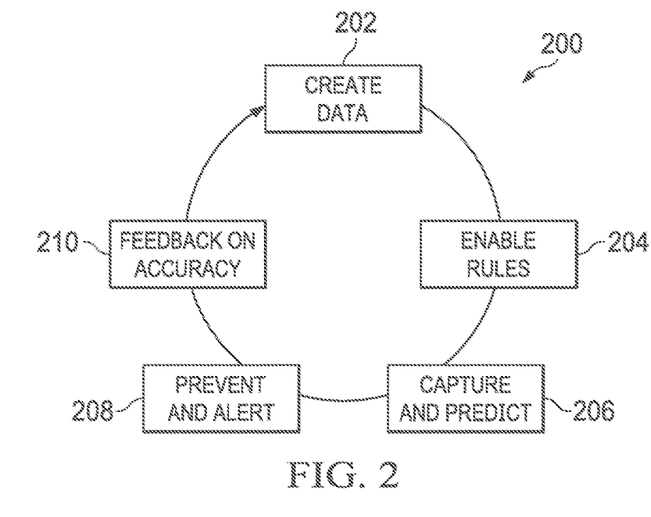
FIG. 2 illustrates an example method, in accordance with embodiments of the present disclosure.

Turning now to FIG. 2, a high-level flow chart is shown of an example method 200 for an analysis system that may be used to detect anomalies in incoming network traffic. At step 202, an initial data set may be created. For example, protocol-specific data may be created for each of the protocols of interest. This data may establish a schema for what sorts of network traffic are expected or normal within a given protocol, as opposed to other sorts of traffic that are to be considered out of the ordinary (and thus potentially malicious).

At step 204, a set of rules may be enabled. This initial set of rules may set up one or more comparisons to the protocol-specific data for determining whether incoming traffic is likely malicious.

At step 206, traffic may be captured. For example, traffic from one or more management controllers such as management controller 112 may be forwarded (e.g., automatically) to the analysis system. Based on the captured traffic and an application of the rules of step 204, predictions may be made regarding the likelihood that the traffic is malicious.

At step 208, if the predicted likelihood is greater than some threshold likelihood (e.g., 10%, 25%, 50%, 75%, 90%, etc.), then a remedial action may be taken. For example, the traffic may be prevented from accessing the management controller. Further, an administrator may be notified. Other remedial actions are also possible in various embodiments.

At step 210, the analysis system may receive feedback regarding the accuracy of its predictions. For example, if a given set of network traffic is erroneously determined to be malicious (or erroneously determined to be non-malicious), then an administrator may later provide input to the analysis system indicating that error. On the other hand, feedback may also be provided in some embodiments indicating that the analysis system was correct, which may be used to reinforce one or more rules or heuristics of the trained model.

Data from step 210 may thus be fed back into the data created at step 202, providing a continually improving analysis system.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Figure 3:
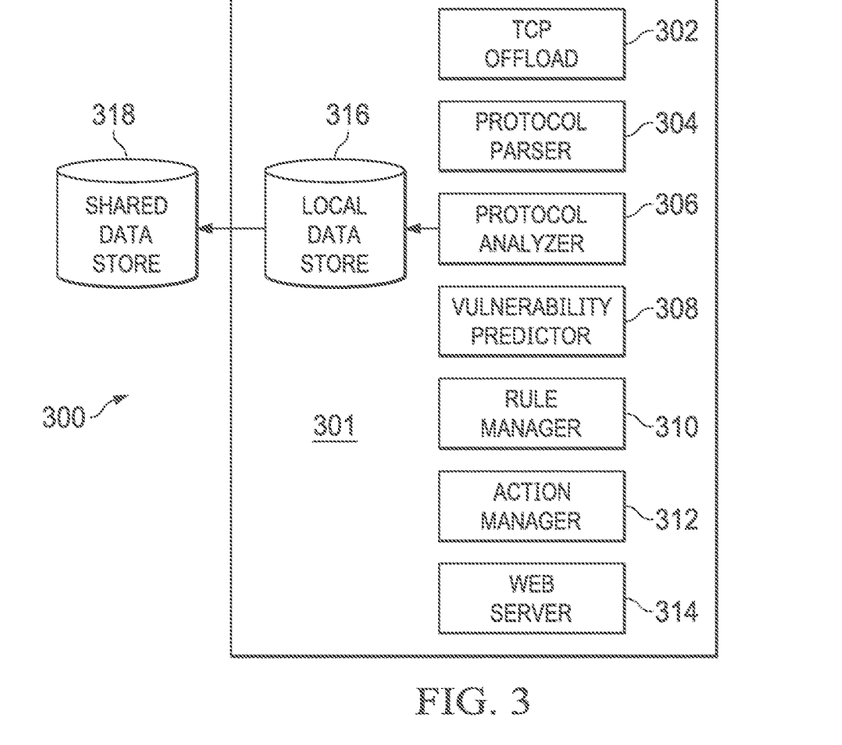
FIG. 3 illustrates a block diagram of an example information handling system, in accordance with embodiments of the present disclosure.

Turning now to FIG. 3, a block diagram of certain components of an analysis system 300 is shown, in accordance with some embodiments. System 300 may include a local intrusion detection system 301, which may receive network traffic (or portions of network traffic) forwarded from one or more local (e.g., within the same server rack, within the same data center, etc.) management controllers. Local intrusion detection system 301 may include some components similar to those of a standard intrusion detection system, such as TCP offload 302, protocol parser 304, rule manager 310, action manager 312, and web server 314.

Local intrusion detection system 301 may further include components configured to implement machine learning aspects of the present disclosure. For example, protocol analyzer 306 and vulnerability predictor 308 (discussed in more detail elsewhere in this disclosure) may comprise the artificial intelligence portion of local intrusion detection system 301. These components may implement data-driven protocol analysis, as well as a predictive classification of the incoming/outgoing packets.

Further, although only one local intrusion detection system 301 is shown, a plurality of such local intrusion detection systems 301 may all provide data to a shared data store 318. In some embodiments, they may also receive feedback from shared data store 318. Thus the artificial intelligence aspects may incorporate data from a number of different local intrusion detection systems 301.

Figure 4:
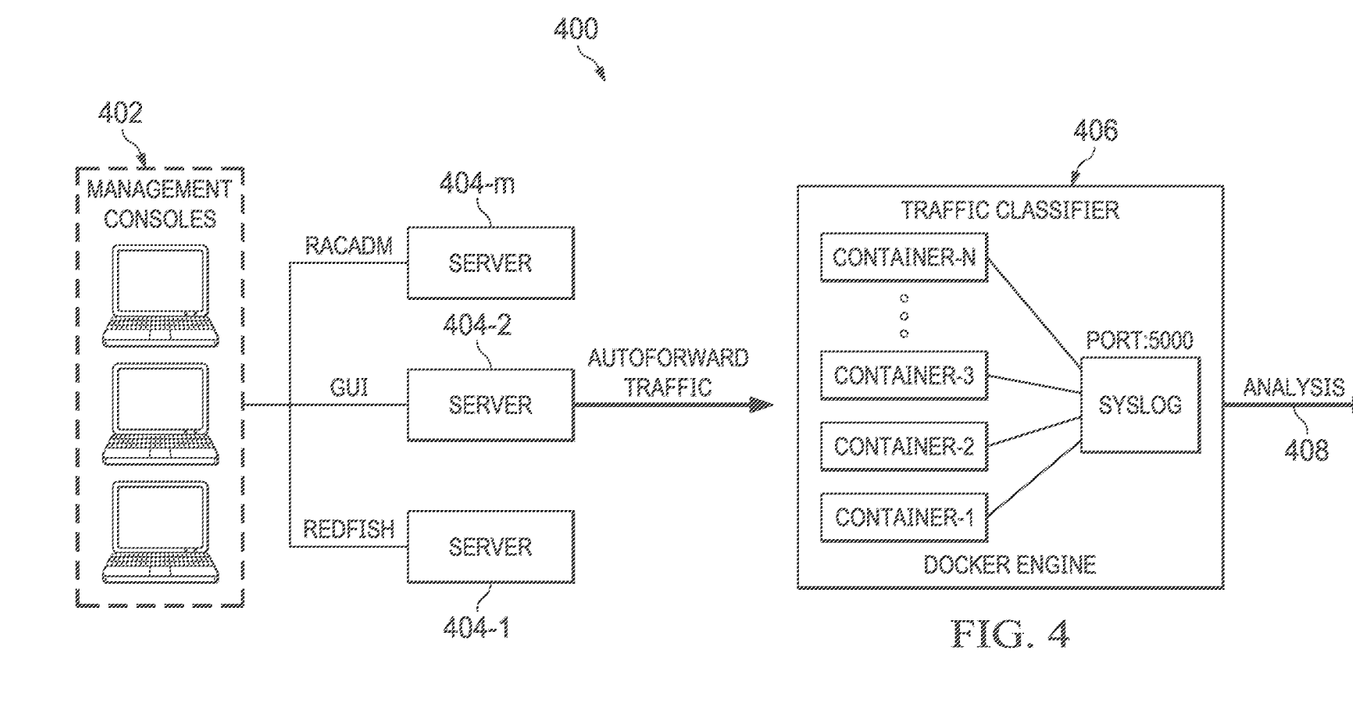
FIG. 4 illustrates a schematic diagram of a system, in accordance with embodiments of the present disclosure.

Turning now to FIG. 4, a system 400 is shown for data collection, tabulation, and analysis. In some embodiments, a plurality of (possibly malicious) management consoles 402 communicate to management controllers of servers 404 using various interfaces such as Redfish, RACADM, GUI, etc. The management controllers may be configured to automatically forward such traffic (or portions thereof) to traffic classifier 406.

The traffic may be mostly identical for most requests within a given protocol. Further, the request fields that are likely to vary may also be known in advance. Traffic classifier 406 may be installed in a controlled environment with no malicious traffic such as a plurality of containers (e.g., Docker containers) running in one or more container engines. In other embodiments, these components may be executed in a non-containerized fashion. These components may classify the forwarded packets based upon the protocol, the header information, and the payloads. A master dataset may be created, analyzed, and visualized via the use of analysis systems 408.

For purposes of concreteness, this disclosure provides some examples of both normal and malicious network traffic below at Listings 1-4. In the malicious examples, the suspicious portions (e.g., the portions that might give rise to a high determined likelihood that traffic is malicious) are emphasized.

POST/cgi-bin/login HTTP/1.1
Host: 100.69.119.49
User-Agent: Mozilla/5.0 (Windows NT 10.0; Win64; x64; rv: 66.0) Gecko/20100101 Firefox/66.0
Content-Length: 143
<? xml version='1.0'?>
<LOGIN>
<REQ>
<USERNAME>root</USERNAME>
<PASSWORD>calvin</PASSWORD>
<CMDINPUT>getsysinfo-d</CMDINPUT>
</REQ></LOGIN>
Listing 1: Normal RACADM Request
POST/cgi-bin/login HTTP/1.1
Host: 100.69.119.49
User-Agent: Mozilla/5.0 (Windows NT 10.0; Win64; x64; rv: 66.0) Gecko/20100101 Firefox/66.0
Content-Length: 143; 'XOR (if (now ( )=sysdate ( ), sleep (5*5),0)) OR'
<? xml version='1.0'?>
<LOGIN>
<REQ>
<USERNAME>root</USERNAME>
<PASSWORD>calvin</PASSWORD>
<CMDINPUT>getsysinfo-d; /bin/touch /tmp/malicious.txt</CMDINPUT>
</REQ></LOGIN>
Listing 2: Potentially Malicious RACADM Request
POST/sysmgmt/2012/server/transient/filestore HTTP/1.1
Host: 100.69.119.49
User-Agent: Mozilla/5.0 (Windows NT 10.0; Win64; x64; rv: 66.0) Gecko/20100101 Firefox/66.0
Accept: application/json, text/plain, */*
Accept-Language: en-US, en; q=0.5
Accept-Encoding: gzip, deflate
XSRF-TOKEN: 76ec1cce51566e7eb034e5503d6e6dda
Content-Type: multipart/form-data; boundary=--------------------------1403884918046
Content-Length: 411
DNT: 1
Connection: close Cookie: -http-session-=76ec1cce51566e7eb034-
e5503d6e6dda----------------------------1403884918046
Content-Disposition: form-data; name="fileName";
filename="abcd.txt"
Content-Type: application/octet-stream
ssh-rsa
AAAAB3NzaClyc2EAAAADAQABAAAAgQDMfoob-
Qaa+/Tp+3pf7x2clK8Waqw1BZDwOu2nEmmItJz9-
bx74vioc4UXFfHE5nFuqKlbRTG/s+OYNGDiZilu-
6bhill 7QyJj6MFph1IRMguon j+AOR+97U+C478ih-
kmUnrB5RybfHuvJoNOULUAzbUHoJ4GgFYJkXj-
43mlQYNSolw==-----------------------------1403-
884918046--

Listing 3: Normal GUI Request

POST/sysmgmt/2012/server/transient/filestore HTTP/1.1
Host: 100.69.119.49
User-Agent: Mozilla/5.0 (Windows NT 10.0; Win64; x64;
rv: 66.0) Gecko/20100101 Firefox/66.0
Accept: application/json, text/plain, */*
Accept-Language: en-US, en; q=0.5
Accept-Encoding: gzip, deflate
XSRF-TOKEN: 76ec1cce51566e7eb034e5503d6e6d-
da76- ec1cce51566e7eb034e5503d6e 6dda76ec1c-
ce51566e7eb034e5503d6e6dda76ec1cce51566e7eb0-
34e550
3d6e6dda76ec1cce51566e7eb034e5503d6e6dda
Content-Type: multipart/form-data; bound-
ary=----------------------------1403884918046
Content-Length: 411
DNT: 1
Connection: close
Cookie: -http-session-=76ec1cce51566e7eb034e-
5503d6e6dda----------------------------1403884918046
Content-Disposition: form-data; name="fileName";
filename="/"
Content-Type: application/octet-streamssh-rsa
AAAAB3NzaClyc2EAAAADAQABAAAAgQDMf
oobQaa+/Tp+3pf7x2clK8Waqw1B ZDwOu2n-
EmmItJz9bx74vioc4UXFfHE5nFuqKlbRTG/s+
OYNGDiZilu6bhill 7QyJj6MFph1IRMguon j+AOR+
97U+C478ihkmUnr B5Rybf HuvJoNOULUAzbUH
OJ4GgFYJkX j 43mlQYN-
Solw==----------------------------1403884918046--

Listing 4: Potentially Malicious GUI Request

Figure 5:
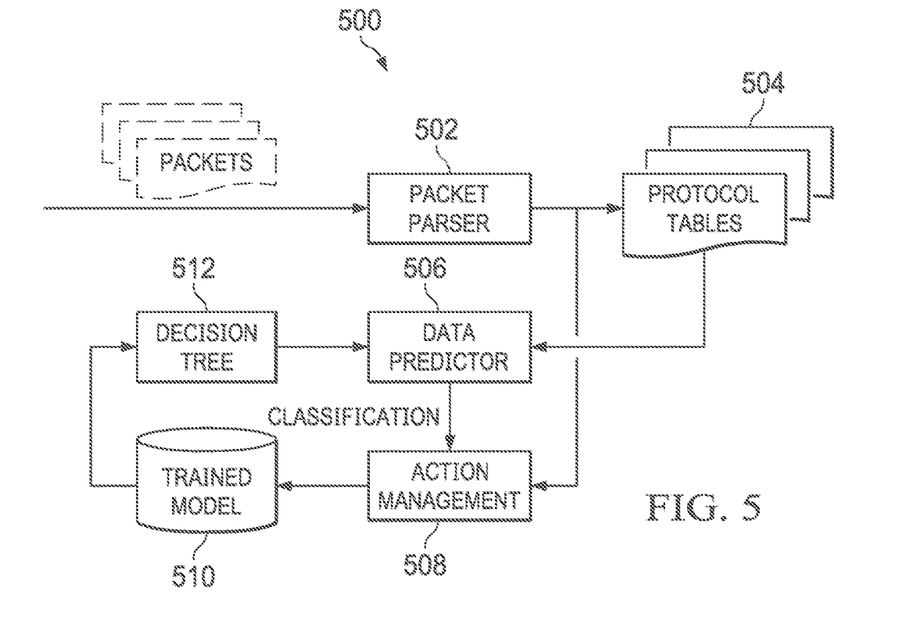
FIG. 5 illustrates an example method, in accordance with embodiments of the present disclosure.

Turning now to FIG. 5 with these examples in mind, a flow chart is shown of an example method 500 for analysis of network traffic. At step 502, incoming packets may be received and parsed by a packet parser. The packets may be classified according to their incoming protocol. For example, common protocols such as RACADM, Redfish, WS-MAN, GUI, SNMP, etc. may be detected based on their known characteristics.

Protocol lookup tables may be populated at step 504. For example, protocol lookup tables may include protocol-specific information that is based on the headers and the schema of the payload of the incoming packets. For example, for a WS-MAN command, the protocol table may have an HTTP header table and a protocol-specific SOAP schema driven table. For a Redfish command, the table may have the HTTP header table and a JSON schema specific table.

Once the relevant protocol table is populated, the observation in each column of the table may be matched with classification data by a data predictor at step 506. For example, a row representing HTTP and protocol-specific data may be classified as a malicious packet or not (e.g., it may be assigned a predicted likelihood of being malicious).

Considering the example of the RACADM packets at Listings 1-2, the Content Length field in the HTTP header is modified in the malicious version. Now, this may be a proper modification or a malicious one. The classifier (e.g., using a decision tree at step 512) may be used to predict the "maliciousness" of the packet. The prediction percentage can provide the classification based on thresholds that may be set based on a given organization's threat tolerance (e.g., packets having maliciousness greater than a given customizable maliciousness threshold may be treated as presumptively malicious).

If the row matches a "malicious" classification, action management 508 may take various actions. For example, the information may be logged, the packet may be dropped, future access by that host may be blocked, and/or any other desired remedial action may be taken.

As noted above, feedback may also be provided by an administrator overriding the prediction if it is determined to be a proper packet. If a packet is allowed but has malicious content, the data may reside in the table and may be later classified as a malicious packet and fed back into the shared training data of trained model 510 to improve future analyses.

One of ordinary skill in the art with the benefit of this disclosure will understand that the preferred initialization point for the method depicted in FIG. 5 and the order of the steps comprising that method may depend on the implementation chosen. In these and other embodiments, this method may be implemented as hardware, firmware, software, applications, functions, libraries, or other instructions. Further, although a FIG. 5 discloses particular number of steps to be taken with respect to the disclosed method, the method may be executed with greater or fewer steps than depicted. The method may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a network interface adapter coupled to a data network; and
   a management controller coupled to a management network separate from the data network, wherein the management controller is configured to provide out-of-band management of the information handling system, the out-of-band management including management while the information handling system is powered off;
   wherein the management controller is configured to:
   receive network traffic from a client information handling system via the management network, the network traffic relating to management of the information handling system;
   transmit at least a portion of the network traffic to a traffic classifier, wherein the traffic classifier is configured to:
   determine a protocol associated with the network traffic, wherein the protocol is a management protocol usable for out-of-band management of the information handling system via the management network and is selected from the group consisting of Intelligent Platform Management Interface (IPMI), Secure Shell (SSH), Remote Access Controller Administration (RACADM), Web Services-Management (WS-MAN), and Redfish;
   compare the network traffic with protocol-specific classification data based on the determined protocol, wherein comparing the network traffic with the protocol-specific classification data includes evaluating headers and schemas of the network traffic to analyze protocol-specific fields of the network traffic for malicious content; and
   determine, based on the comparison, a likelihood that the network traffic is malicious; and
   based on the determined likelihood exceeding a threshold, execute a remedial action with respect to the network traffic.

2. The information handling system of claim 1, wherein the remedial action includes ignoring the network traffic.

3. The information handling system of claim 1, wherein the remedial action includes blocking future network traffic from the client information handling system.

4. The information handling system of claim 1, wherein the remedial action includes notifying an administrator.

5. The information handling system of claim 1, wherein the traffic classifier is configured to execute in a plurality of containers on a traffic classifier information handling system.

6. The information handling system of claim 1, wherein the traffic classifier is configured to execute in a plurality of containers on a plurality of traffic classifier information handling systems.

7. The information handling system of claim 1, wherein the traffic classifier is further configured to:
   receive input from an administrator indicating an accuracy of the determined likelihood; and
   update the protocol-specific classification data based on the input.

8. A method comprising:
   in an information handling system comprising a network interface adapter coupled to a data network and a management controller coupled to a management network separate from the data network, wherein the management controller is configured to provide out-of-band management of the information handling system, the out-of-band management including management of the information handling system while the information handling system is powered off:
   the management controller receiving network traffic from a client information handling system via the management network, the network traffic relating to management of the information handling system;
   the management controller transmitting at least a portion of the network traffic to a traffic classifier, wherein the traffic classifier is configured to:
   determine a protocol associated with the network traffic, wherein the protocol is a management protocol usable for out-of-band management of the information handling system via the management network and is selected from the group consisting of Intelligent Platform Management Interface (IPMI), Secure Shell (SSH), Remote Access Controller Administration (RACADM), Web Services-Management (WS-MAN), and Redfish;
   compare the network traffic with protocol-specific classification data based on the determined protocol, wherein comparing the network traffic with the protocol-specific classification data includes evaluating headers and schemas of the network traffic to analyze protocol-specific fields of the network traffic for malicious content; and
   determine, based on the comparison, a likelihood that the network traffic is malicious; and
   based on the determined likelihood exceeding a threshold, the management controller executing a remedial action with respect to the network traffic.

9. The method of claim 8, wherein the remedial action includes ignoring the network traffic.

10. The method of claim 8, wherein the remedial action includes blocking future network traffic from the client information handling system.

11. The method of claim 8, wherein the remedial action includes notifying an administrator.

12. The method of claim 8, wherein the traffic classifier is further configured to:
    receive input from an administrator indicating an accuracy of the determined likelihood; and
    update the protocol-specific classification data based on the input.

13. The method of claim 8, wherein the traffic classifier is configured to execute in a plurality of containers on a traffic classifier information handling system.

14. An article of manufacture comprising a non-transitory, computer-readable medium having computer-executable code thereon that is executable by at least one processor of at least one information handling system for:

receiving, from each of a plurality of management controllers of other information handling systems coupled to respective management networks separate from data networks of the other information handling systems, portions of network traffic forwarded from respective client information handling systems via the management networks, the network traffic relating to management via the management controllers, wherein the plurality of management controllers are configured to provide out-of-band management of the other information handling system, the out-of-band management including management of the other information handling systems while the other information handling systems are powered off;

determining a protocol associated with each portion of the network traffic, wherein the protocol is a management protocol usable for out-of-band management of the information handling system via the management network and is selected from the group consisting of Intelligent Platform Management Interface (IPMI), Secure Shell (SSH), Remote Access Controller Administration (RACADM), Web Services-Management (WS-MAN), and Redfish;

comparing each portion of the network traffic with protocol-specific classification data based on the respective determined protocol, wherein comparing the network traffic with the protocol-specific classification data includes evaluating headers and schemas of the network traffic to analyze protocol-specific fields of the network traffic for malicious content;

determining, based on the comparison, a likelihood that each portion of the network traffic is malicious; and for each portion of the network traffic, based on the determined likelihood exceeding a threshold, causing each respective management controller to execute a remedial action with respect to the network traffic.

15. The article of claim 14, wherein the remedial action includes ignoring the network traffic.

16. The article of claim 14, wherein the remedial action includes blocking future network traffic from the client information handling system.

17. The article of claim 14, wherein the remedial action includes notifying an administrator.

18. The article of claim 14, wherein the computer-executable code is configured to execute in a plurality of containers on a single traffic classifier information handling system.

19. The article of claim 14, wherein the computer-executable code is configured to execute in a plurality of containers on a plurality of traffic classifier information handling systems.

20. The article of claim 14, wherein the computer-executable code is further executable for:

receiving input from an administrator indicating an accuracy of the determined likelihood; and updating the protocol-specific classification data based on the input.

* * * * *